US009210751B2

(12) United States Patent
Reed

(10) Patent No.: US 9,210,751 B2
(45) Date of Patent: Dec. 8, 2015

(54) SOLID STATE LIGHTING, DRIVE CIRCUIT AND METHOD OF DRIVING SAME

(71) Applicant: Express Imaging Systems, LLC, Seattle, WA (US)

(72) Inventor: William G. Reed, Seattle, WA (US)

(73) Assignee: Express Imaging Systems, LLC, Renton, WA (US)

(*) Notice: Subject to any disclaimer, the term of this patent is extended or adjusted under 35 U.S.C. 154(b) by 399 days.

(21) Appl. No.: 13/875,000

(22) Filed: May 1, 2013

(65) Prior Publication Data

US 2013/0313982 A1 Nov. 28, 2013

Related U.S. Application Data

(60) Provisional application No. 61/640,963, filed on May 1, 2012.

(51) Int. Cl.
*H05B 33/08* (2006.01)

(52) U.S. Cl.
CPC ........ *H05B 33/0818* (2013.01); *H05B 33/0815* (2013.01); *Y02B 20/341* (2013.01)

(58) Field of Classification Search
CPC ........... H05B 33/0815; H05B 33/0818; Y02B 20/341; Y02B 20/346; Y02B 20/347
See application file for complete search history.

(56) References Cited

U.S. PATENT DOCUMENTS

| 2,745,055 A | 5/1956 | Woerdemann |
| 4,153,927 A | 5/1979 | Owens |
| 4,237,377 A | 12/1980 | Sansum |
| 4,663,521 A | 5/1987 | Maile |
| 5,086,379 A | 2/1992 | Denison et al. |
| 5,160,202 A | 11/1992 | Légaré |
| 5,161,107 A | 11/1992 | Mayeaux et al. |
| 5,230,556 A | 7/1993 | Canty et al. |
| 5,276,385 A | 1/1994 | Itoh et al. |
| 5,343,121 A | 8/1994 | Terman et al. |
| 5,349,505 A | 9/1994 | Poppenheimer |

(Continued)

FOREIGN PATENT DOCUMENTS

| DE | 4001980 A1 | 8/1990 |
| EP | 1 734 795 A1 | 12/2006 |

(Continued)

OTHER PUBLICATIONS

International Search Report, mailed Nov. 19, 2013 for PCT/US2013/052092, 4 pages.

(Continued)

*Primary Examiner* — Patrick O'Neill
(74) *Attorney, Agent, or Firm* — Seed IP Law Group PLLC

(57) ABSTRACT

A power converter output stage provides acceptable current matching between sets or strings of solid state light sources (e.g., LEDs) with different forward voltages, and protects the sets or strings from excessive over-current in the case of a light source failing as a short. The sets or strings are electrically coupled across respective inductors of a secondary of a transformer, the sets or strings not electrically in parallel with one another. The secondary of the transformer essentially self balances. The embodiments described employ an LLC resonator converter topology, but could be implemented as part of a Flyback, LLC resonator or other switch mode topology.

20 Claims, 3 Drawing Sheets

(56) References Cited

U.S. PATENT DOCUMENTS

| | | |
|---|---|---|
| 5,450,302 A | 9/1995 | Maase et al. |
| 5,561,351 A | 10/1996 | Vrionis et al. |
| 5,589,741 A | 12/1996 | Terman et al. |
| 5,808,294 A | 9/1998 | Neumann |
| 6,111,739 A | 8/2000 | Wu et al. |
| 6,149,283 A | 11/2000 | Conway et al. |
| 6,377,191 B1 | 4/2002 | Takubo |
| 6,612,720 B1 | 9/2003 | Beadle |
| 6,674,060 B2 | 1/2004 | Antila |
| 6,681,195 B1 | 1/2004 | Poland et al. |
| 6,746,274 B1 | 6/2004 | Verfuerth |
| 6,753,842 B1 | 6/2004 | Williams et al. |
| 6,828,911 B2 | 12/2004 | Jones et al. |
| 6,841,947 B2 | 1/2005 | Berg-johansen |
| 6,902,292 B2 | 6/2005 | Lai |
| 6,985,827 B2 | 1/2006 | Williams et al. |
| 7,019,276 B2 | 3/2006 | Cloutier et al. |
| 7,066,622 B2 | 6/2006 | Alessio |
| 7,081,722 B1 | 7/2006 | Huynh et al. |
| 7,122,976 B1 | 10/2006 | Null et al. |
| 7,188,967 B2 | 3/2007 | Dalton et al. |
| 7,196,477 B2 | 3/2007 | Richmond |
| 7,239,087 B2 | 7/2007 | Ball |
| 7,252,385 B2 | 8/2007 | Engle et al. |
| 7,258,464 B2 | 8/2007 | Morris et al. |
| 7,270,441 B2 | 9/2007 | Fiene |
| 7,281,820 B2 | 10/2007 | Bayat et al. |
| 7,314,291 B2 | 1/2008 | Tain et al. |
| 7,317,403 B2 | 1/2008 | Grootes et al. |
| 7,322,714 B2 | 1/2008 | Barnett et al. |
| 7,330,568 B2 | 2/2008 | Nagaoka et al. |
| 7,339,323 B2 | 3/2008 | Bucur |
| 7,339,471 B1 | 3/2008 | Chan et al. |
| 7,405,524 B2 | 7/2008 | Null et al. |
| 7,438,440 B2 | 10/2008 | Dorogi |
| 7,440,280 B2 | 10/2008 | Shuy |
| 7,468,723 B1 | 12/2008 | Collins |
| 7,524,089 B2 | 4/2009 | Park |
| 7,538,499 B2 | 5/2009 | Ashdown |
| 7,547,113 B2 | 6/2009 | Lee |
| 7,559,674 B2 | 7/2009 | He et al. |
| 7,564,198 B2 | 7/2009 | Yamamoto et al. |
| 7,569,802 B1 | 8/2009 | Mullins |
| 7,578,596 B2 | 8/2009 | Martin |
| 7,578,597 B2 | 8/2009 | Hoover et al. |
| 7,627,372 B2 | 12/2009 | Vaisnys et al. |
| 7,631,324 B2 | 12/2009 | Buonasera et al. |
| 7,633,463 B2 | 12/2009 | Negru |
| 7,638,743 B2 | 12/2009 | Bartol et al. |
| 7,677,753 B1 | 3/2010 | Wills |
| 7,688,002 B2 | 3/2010 | Ashdown et al. |
| 7,688,222 B2 | 3/2010 | Peddie et al. |
| 7,703,951 B2 | 4/2010 | Piepgras et al. |
| 7,746,003 B2 | 6/2010 | Verfuerth et al. |
| D621,410 S | 8/2010 | Verfuerth et al. |
| D621,411 S | 8/2010 | Verfuerth et al. |
| 7,804,200 B2 | 9/2010 | Flaherty |
| 7,834,922 B2 | 11/2010 | Kurane |
| 7,932,535 B2 | 4/2011 | Mahalingam et al. |
| 7,940,191 B2 | 5/2011 | Hierzer |
| 7,952,609 B2 | 5/2011 | Simerly et al. |
| 7,960,919 B2 | 6/2011 | Furukawa |
| 7,983,817 B2 | 7/2011 | Breed |
| 7,985,005 B2 | 7/2011 | Alexander et al. |
| 8,100,552 B2 | 1/2012 | Spero |
| 8,118,456 B2 | 2/2012 | Reed et al. |
| 8,143,769 B2 | 3/2012 | Li |
| 8,174,212 B2 | 5/2012 | Tziony et al. |
| 8,334,640 B2 | 12/2012 | Reed et al. |
| 8,344,665 B2 | 1/2013 | Verfuerth et al. |
| 8,376,583 B2 | 2/2013 | Wang et al. |
| 8,378,563 B2 | 2/2013 | Reed et al. |
| 8,445,826 B2 | 5/2013 | Verfuerth |
| 8,476,565 B2 | 7/2013 | Verfuerth |
| 8,508,137 B2 | 8/2013 | Reed |
| 8,541,950 B2 | 9/2013 | Reed |
| 8,586,902 B2 | 11/2013 | Verfuerth |
| 8,604,701 B2 | 12/2013 | Verfuerth et al. |
| 8,749,635 B2 | 6/2014 | Högasten et al. |
| 8,764,237 B2 | 7/2014 | Wang et al. |
| 8,779,340 B2 | 7/2014 | Verfuerth et al. |
| 8,779,686 B2 * | 7/2014 | Jin ............... 315/294 |
| 8,866,582 B2 | 10/2014 | Verfuerth et al. |
| 8,872,430 B2 * | 10/2014 | Yang ............... 315/122 |
| 8,884,203 B2 | 11/2014 | Verfuerth et al. |
| 8,921,751 B2 | 12/2014 | Verfuerth |
| 2003/0016143 A1 | 1/2003 | Ghazarian |
| 2003/0184672 A1 | 10/2003 | Wu et al. |
| 2004/0192227 A1 | 9/2004 | Beach et al. |
| 2005/0231133 A1 | 10/2005 | Lys |
| 2006/0014118 A1 | 1/2006 | Utama |
| 2006/0066264 A1 | 3/2006 | Ishigaki et al. |
| 2006/0098440 A1 | 5/2006 | Allen |
| 2007/0032990 A1 | 2/2007 | Williams et al. |
| 2007/0102033 A1 | 5/2007 | Petrocy |
| 2007/0225933 A1 | 9/2007 | Shimomura |
| 2008/0018261 A1 | 1/2008 | Kastner |
| 2008/0043106 A1 | 2/2008 | Hassapis et al. |
| 2008/0130304 A1 | 6/2008 | Rash et al. |
| 2008/0232116 A1 | 9/2008 | Kim |
| 2008/0266839 A1 | 10/2008 | Claypool et al. |
| 2009/0046151 A1 | 2/2009 | Nagaoka et al. |
| 2009/0058320 A1 | 3/2009 | Chou et al. |
| 2009/0160358 A1 | 6/2009 | Leiderman |
| 2009/0161356 A1 | 6/2009 | Negley et al. |
| 2009/0167203 A1 | 7/2009 | Dahlman et al. |
| 2009/0195179 A1 | 8/2009 | Joseph et al. |
| 2009/0230883 A1 | 9/2009 | Haug |
| 2009/0235208 A1 | 9/2009 | Nakayama et al. |
| 2009/0261735 A1 | 10/2009 | Sibalich et al. |
| 2009/0268023 A1 | 10/2009 | Hsieh |
| 2009/0278479 A1 | 11/2009 | Platner et al. |
| 2009/0284155 A1 | 11/2009 | Reed et al. |
| 2009/0315485 A1 | 12/2009 | Verfuerth et al. |
| 2010/0001652 A1 | 1/2010 | Damsleth |
| 2010/0052557 A1 | 3/2010 | Van Der Veen et al. |
| 2010/0096460 A1 | 4/2010 | Carlson et al. |
| 2010/0123403 A1 | 5/2010 | Reed |
| 2010/0164406 A1 | 7/2010 | Kost et al. |
| 2010/0171442 A1 | 7/2010 | Draper et al. |
| 2010/0259193 A1 | 10/2010 | Umezawa et al. |
| 2010/0271802 A1 | 10/2010 | Recker et al. |
| 2010/0277082 A1 | 11/2010 | Reed et al. |
| 2010/0295946 A1 | 11/2010 | Reed et al. |
| 2010/0309310 A1 | 12/2010 | Albright |
| 2011/0001626 A1 | 1/2011 | Yip et al. |
| 2011/0006703 A1 | 1/2011 | Wu et al. |
| 2011/0026264 A1 | 2/2011 | Reed et al. |
| 2011/0215731 A1 | 9/2011 | Jeong et al. |
| 2011/0221346 A1 | 9/2011 | Lee et al. |
| 2011/0251751 A1 | 10/2011 | Knight |
| 2011/0310605 A1 | 12/2011 | Renn et al. |
| 2012/0001566 A1 | 1/2012 | Josefowicz et al. |
| 2012/0019971 A1 | 1/2012 | Flaherty et al. |
| 2012/0038490 A1 | 2/2012 | Verfuerth |
| 2012/0119669 A1 | 5/2012 | Melanson et al. |
| 2012/0169053 A1 | 7/2012 | Tchoryk, Jr. et al. |
| 2012/0209755 A1 | 8/2012 | Verfuerth et al. |
| 2012/0221154 A1 | 8/2012 | Runge |
| 2012/0224363 A1 | 9/2012 | Van De Ven |
| 2012/0230584 A1 | 9/2012 | Kubo et al. |
| 2012/0262069 A1 | 10/2012 | Reed |
| 2013/0033183 A1 | 2/2013 | Verfuerth et al. |
| 2013/0043792 A1 | 2/2013 | Reed |
| 2013/0049613 A1 | 2/2013 | Reed |
| 2013/0126715 A1 | 5/2013 | Flaherty |
| 2013/0131882 A1 | 5/2013 | Verfuerth et al. |
| 2013/0141000 A1 | 6/2013 | Wei et al. |
| 2013/0141010 A1 | 6/2013 | Reed et al. |
| 2013/0163243 A1 | 6/2013 | Reed |
| 2013/0193857 A1 | 8/2013 | Tlachac et al. |
| 2013/0229518 A1 | 9/2013 | Reed et al. |
| 2013/0235202 A1 | 9/2013 | Nagaoka et al. |
| 2013/0340353 A1 | 12/2013 | Whiting et al. |

(56) References Cited

U.S. PATENT DOCUMENTS

| | | | |
|---|---|---|---|
| 2014/0001961 | A1 | 1/2014 | Anderson et al. |
| 2014/0078308 | A1 | 3/2014 | Verfuerth |
| 2014/0097759 | A1 | 4/2014 | Verfuerth et al. |
| 2014/0313719 | A1 | 10/2014 | Wang et al. |
| 2015/0015716 | A1 | 1/2015 | Reed et al. |
| 2015/0077019 | A1 | 3/2015 | Reed et al. |

FOREIGN PATENT DOCUMENTS

| | | | |
|---|---|---|---|
| EP | 2 781 138 A1 | 9/2014 | |
| FR | 2 883 306 A1 | 9/2006 | |
| JP | 6-335241 A | 12/1994 | |
| JP | 2001-333420 A | 11/2001 | |
| JP | 2004-279668 A | 10/2004 | |
| JP | 2004-320024 A | 11/2004 | |
| JP | 2004-349065 A | 12/2004 | |
| JP | 2005-93171 A | 4/2005 | |
| JP | 2005-198238 A | 7/2005 | |
| JP | 2005-310997 A | 11/2005 | |
| JP | 2006-179672 A | 7/2006 | |
| JP | 2006-244711 A | 9/2006 | |
| JP | 2008-59811 A | 3/2008 | |
| JP | 2008-509538 A | 3/2008 | |
| JP | 2008-130523 A | 6/2008 | |
| JP | 2008-159483 A | 7/2008 | |
| JP | 2008-177144 A | 7/2008 | |
| JP | 2008-535279 A | 8/2008 | |
| JP | 2010-504628 A | 2/2010 | |
| KR | 2005078403 A | 8/2005 | |
| KR | 10-2006-0086254 A | 7/2006 | |
| KR | 10-2009-0042400 A | 4/2009 | |
| KR | 10-0935736 B1 | 1/2010 | |
| KR | 20-2010-0007230 U | 7/2010 | |
| KR | 10-1001276 B1 | 12/2010 | |
| KR | 10-1044224 B1 | 6/2011 | |
| KR | 10-1150876 B1 | 5/2012 | |
| WO | 02/076068 A1 | 9/2002 | |
| WO | 03/056882 A1 | 7/2003 | |
| WO | 2006/057866 A2 | 6/2006 | |
| WO | 2007/023454 A1 | 3/2007 | |
| WO | 2007/036873 A2 | 4/2007 | |
| WO | 2008/030450 A2 | 3/2008 | |
| WO | 2008/034242 A1 | 3/2008 | |
| WO | 2009/040703 A2 | 4/2009 | |
| WO | 2012/006710 A1 | 1/2012 | |
| WO | 2012/142115 A2 | 10/2012 | |
| WO | 2013/074900 A1 | 5/2013 | |
| WO | 2014/018773 A1 | 1/2014 | |
| WO | 2014/039683 A1 | 3/2014 | |
| WO | 2014/078854 A1 | 5/2014 | |

OTHER PUBLICATIONS

International Search Report, mailed Dec. 30, 2013 for PCT/US2013/058266, 3 pages.
Reed, "Apparatus and Method of Energy Efficient Illumination," Office Action mailed Nov. 27, 2013, for U.S. Appl. No. 13/943,537, 8 pages.
Reed, "Apparatus and Method of Energy Efficient Illumination Using Received Signals," Amendment filed Jan. 2, 2014, U.S. Appl. No. 13/085,301, 26 pages.
Reed, "High Efficiency Power Controller for Luminaire," U.S. Appl. No. 61/905,699, filed Nov. 18, 2013, 5 pages.
Written Opinion, mailed Nov. 19, 2013 for PCT/US2013/052092, 7 pages.
Written Opinion, mailed Dec. 30, 2013 for PCT/US2013/058266, 8 pages.
Japanese Office Action, dated Jan. 6, 2015, for corresponding Japanese Application No. 2011-536564, 6 pages.
Reed et al., "Apparatus and Method of Operating a Luminaire," Office Action mailed Dec. 22, 2014, for U.S. Appl. No. 13/558,191, 17 pages.
Reed, "Adjustable Output Solid-State Lighting Device," Office Acton mailed Jan. 2, 2015, for U.S. Appl. No. 13/707,123, 24 pages.
Reed, "Electronic Control to Regulate Power for Solid-State Lighting and Methods Thereof," Amendment filed Dec. 15, 2014, for U.S. Appl. No. 12/619,535, 21 pages.
Reed, "Luminaire With Ambient Sensing and Autonomous Control Capabilities," Office Action mailed Dec. 17, 2014, for U.S. Appl. No. 13/786,332, 20 pages.
International Search Report, mailed Feb. 26, 2014, for PCT/US2013/070794, 3 pages.
Poplawski, "Exploring Flicker & LEDs," 2010 DOE SSL Market Introduction Workshop, U.S. Department of Energy, Jul. 22, 2010, 16 pages.
Reed et al., "Adjustable Output Solid-State Lamp With Security Features," Office Action mailed Feb. 27, 2014, for U.S. Appl. No. 13/679,687, 11 pages.
Reed et al., "Long-Range Motion Detection for Illumination Control," Office Action mailed Jan. 30, 2014, for U.S. Appl. No. 12/784,080, 26 pages.
Reed, "Ambient Light Control in Solid State Lamps and Luminaires," U.S. Appl. No. 61/933,733, filed Jan. 30, 2014, 8 pages.
Reed, "Photocontrol for Luminaire Consumes Very Low Power," U.S. Appl. No. 14/158,630, filed Jan. 17, 2014, 71 pages.
Reed, "Systems, Methods, and Apparatuses for Using a High Current Switching Device As a Logic Level Sensor," U.S. Appl. No. 61/764,395, filed Feb. 13, 2013, 48 pages.
Reed, "Systems, Methods, and Apparatuses for Using a High Current Switching Device As a Logic Level Sensor," U.S. Appl. No. 14/179,737, filed Feb. 13, 2014, 48 pages.
Written Opinion, mailed Feb. 26, 2014, for PCT/US2013/070794, 10 pages.
Reed et al., "Apparatus and Method for Schedule Based Operations of a Luminaire," Office Action mailed Mar. 2, 2015, for U.S. Appl. No. 14/552,274, 7 pages.
Reed et al., "Apparatus and Method of Operating a Luminaire," Amendment filed Mar. 19, 2015, for U.S. Appl. No. 13/558,191, 20 pages.
Reed et al., "Systems and Methods That Employ Object Recognition," Office Action mailed Feb. 9, 2015, for U.S. Appl. No. 13/411,321, 40 pages.
Reed, "Adjustable Output Solid-State Lighting Device," Amendment filed Apr. 2, 2015, for U.S. Appl. No. 13/707,123, 14 pages.
Reed, "Ambient Light Control in Solid State Lamps and Luminaires," Amendment filed Jan. 29, 2015, for U.S. Appl. No. 14/609,168, 12 pages.
Reed, "Ambient Light Control in Solid State Lamps and Luminaires," U.S. Appl. No. 14/609,168, filed Jan. 29, 2015, 77 pages.
Reed, "Low Power Photocontrol for Luminaire," U.S. Appl. No. 62/137,666, filed Mar. 24, 2015, 36 pages.
Reed, "Luminaire With Adjustable Illumination Pattern," U.S. Appl. No. 62/114,826, filed Feb. 11, 2015, 68 pages.
Reed, "Luminaire With Ambient Sensing and Autonomous Control Capabilities," Amendment filed Mar. 13, 2015, for U.S. Appl. No. 13/786,332, 23 pages.
Reed et al., "Apparatus and Method for Schedule Based Operation of a Luminaire," Office Action mailed Mar. 26, 2014, for U.S. Appl. No. 13/604,327, 10 pages.
Reed et al., "Long-Range Motion Detection for Illumination Control," Amendment filed Apr. 28, 2014, for U.S. Appl. No. 12/784,080, 20 pages.
Reed, "Apparatus and Method of Energy Efficient Illumination," Notice of Allowance mailed Apr. 11, 2014, for U.S. Appl. No. 13/943,537, 9 pages.
Reed, "Apparatus and Method of Energy Efficient Illumination Using Received Signals," Office Action mailed Apr. 23, 2014, for U.S. Appl. No. 13/085,301, 12 pages.
Reed, "Electronic Control to Regulate Power for Solid-State Lighting and Methods Thereof," Office Action mailed Mar. 26, 2014, for U.S. Appl. No. 12/619,535, 16 pages.
Reed et al., "Adjustable Output Solid-State Lamp With Security Features," Amendment filed Jun. 24, 2014, for U.S. Appl. No. 13/679,687, 11 pages.
Reed et al., "Apparatus and Method for Schedule Based Operation of a Luminaire," Amendment filed Jun. 24, 2014, for U.S. Appl. No. 13/604,327, 14 pages.

(56) References Cited

OTHER PUBLICATIONS

Reed et al., "Apparatus and Method for Schedule Based Operation of a Luminaire," Notice of Allowance mailed Jul. 7, 2014, for U.S. Appl. No. 13/604,327, 8 pages.
Reed et al., "Long-Range Motion Detection for Illumination Control," Notice of Allowance mailed Jun. 20, 2014, for U.S. Appl. No. 12/784,080, 7 pages.
Reed, "Apparatus and Method of Energy Efficient Illumination," U.S. Appl. No. 14/329,508, filed Jul. 11, 2014, 61 pages.
Reed, "Apparatus and Method of Energy Efficient Illumination Using Received Signals," Amendment filed Jul. 23, 2014, for U.S. Appl. No. 13/085,301, 12 pages.
Reed, "Electronic Control to Regulate Power for Solid-State Lighting and Methods Thereof," Amendment filed May 27, 2014, for U.S. Appl. No. 12/619,535, 22 pages.
Reed, "Luminaire With Atmospheric Electrical Activity Detection and Visual Alert Capabilities," Notice of Allowance mailed Jul. 1, 2014, for U.S. Appl. No. 13/786,114, 9 pages.
Extended European Search Report, dated Aug. 13, 2014, for corresponding European Application No. 09826926.9, 8 pages.
Reed et al., "Adjustable Output Solid-State Lamp With Security Features," Notice of Allowance mailed Aug. 29, 2014, for U.S. Appl. No. 13/679,687, 9 pages.
Reed et al., "Systems and Methods That Employ Object Recognition," Office Action mailed Aug. 25, 2014, for U.S. Appl. No. 13/411,321, 35 pages.
Reed, "Apparatus and Method of Energy Efficient Illumination," Office Action mailed Aug. 28, 2014, for U.S. Appl. No. 14/329,508, 8 pages.
Reed, "Apparatus and Method of Energy Efficient Illumination Using Received Signals," Notice of Allowance mailed Jul. 30, 2014, for U.S. Appl. No. 13/085,301, 5 pages.
Reed, "Electronic Control to Regulate Power for Solid-State Lighting and Methods Thereof," Office Action mailed Aug. 14, 2014, for U.S. Appl. No. 12/619,535, 16 pages.
"Lcd Backlight I/O Ports and Power Protection Circuit Design," dated May 2, 2011, retrieved Jun. 10, 2011, retrieved from http://www.chipoy.info/gadgets/lcd-backlight-i-o-ports-and-power-pr . . . , 4 pages.
EE Herald, "Devices to protect High brightness LED from ESD," dated Mar. 16, 2009, retrieved Jun. 10, 2011, retrieved from http://www.eeherald.com/section/new-products/np100779.html, 1 page.
Fairchild Semiconductor, "LED Application Design Guide Using Half-Bridge LLC Resonant Converter for 100W Street Lighting," AN-9729, Fairchild Semiconductor Corporation, Rev. 1.0.0, Mar. 22, 2011, 17 pages.
Huang, "Designing an LLC Resonant Half-Bridge Power Converter," 2010 Texas Instruments Power Supply Design Seminar, SEM1900, Topic 3, TI Literature No. SLUP263, Copyright 2010, 2011, Texas Instruments Incorporated, 28 pages.
International Search Report, mailed Jul. 9, 2009 for PCT/US2009/043171, 5 pages.
International Search Report, mailed Jun. 21, 2010 for PCT/US2009/064625, 3 pages.
International Search Report, mailed Dec. 13, 2010 for PCT/US2010/035649, 3 pages.
International Search Report, mailed Dec. 15, 2010 for PCT/US2010/035658, 3 pages.
International Search Report, mailed Dec. 28, 2010 for PCT/US2010/035651, 3 pages.
International Search Report, mailed Sep. 30, 2011 for PCT/US2011/021359, 3 pages.
International Search Report, mailed Oct. 8, 2012 for PCT/US2012/033059, 3 pages.
International Search Report, mailed Jan. 14, 2013 for PCT/US2012/052009, 3 pages.
International Search Report, mailed Feb. 27, 2013 for PCT/US2012/065476, 3 pages.

Kadirvel et al., "Self-Powered, Ambient Light Sensor Using bq25504," Texas Instruments, Application Report, SLUA629—Jan. 2012, 6 pages.
Littelfuse, "Application Note: Protecting LEDs in Product Designs," 2009, 2 pages.
Panasonic Electronic Components, "LED Lighting Solutions," 2009, 6 pages.
Reed et al., "Adjustable Output Solid-State Lamp With Security Features," U.S. Appl. No. 61/561,616, filed Nov. 18, 2011, 33 pages.
Reed et al., "Apparatus and Method for Schedule Based Operation of a Luminaire" U.S. Appl. No. 13/604,327, filed Sep. 5, 2012, 44 pages.
Reed et al., "Apparatus and Method of Operating a Luminaire," U.S. Appl. No. 13/558,191, filed Jul. 25, 2012, 84 pages.
Reed et al., "Apparatus, Method to Change Light Source Color Temperature With Reduced Optical Filtering Losses," U.S. Appl. No. 61/295,519, filed Jan. 15, 2010, 35 pages.
Reed et al., "Apparatus, Method to Change Light Source Color Temperature With Reduced Optical Filtering Losses," U.S. Appl. No. 61/406,490, filed Oct. 25, 2010, 46 pages.
Reed et al., "Apparatus, Method to Enhance Color Contrast in Phosphor-Based Solid State Lights," U.S. Appl. No. 61/534,722, filed Sep. 14, 2011, 53 pages.
Reed et al., "Electrically Isolated Heat Sink for Solid-State Light," U.S. Appl. No. 61/229,435, filed Jul. 29, 2009, 29 pages.
Reed et al., "Gas-Discharge Lamp Replacement," U.S. Appl. No. 61/052,924, filed May 13, 2008, 32 pages.
Reed et al., "Gas-Discharge Lamp Replacement With Passive Cooling," U.S. Appl. No. 61/174,913, filed May 1, 2009, 29 pages.
Reed et al., "Long-Range Motion Detection for Illumination Control," U.S. Appl. No. 61/180,017, filed May 20, 2009, 32 pages.
Reed et al., "Long-Range Motion Detection for Illumination Control," Office Action mailed Dec. 21, 2012, for U.S. Appl. No. 12/784,080, 26 pages.
Reed et al., "Long-Range Motion Detection for Illumination Control," Amendment filed Apr. 22, 2013, for U.S. Appl. No. 12/784,080, 17 pages.
Reed et al., "Long-Range Motion Detection for Illumination Control," Office Action mailed Jul. 22, 2013, for U.S. Appl. No. 12/784,080, 29 pages.
Reed et al., "Long-Range Motion Detection for Illumination Control," Amendment filed Sep. 27, 2013, for U.S. Appl. No. 12/784,080, 20 pages.
Reed et al., "Low-Profile Pathway Illumination System," U.S. Appl. No. 61/051,619, filed May 8, 2008, 25 pages.
Reed et al., "Low-Profile Pathway Illumination System," Office Action, dated May 5, 2011, for U.S. Appl. No. 12/437,472, 24 pages.
Reed et al., "Low-Profile Pathway Illumination System," Amendment filed Jul. 29, 2011, for U.S. Appl. No. 12/437,472, 19 pages.
Reed et al., "Low-Profile Pathway Illumination System," Notice of Allowance, dated Oct. 14, 2011, for U.S. Appl. No. 12/437,472, 9 pages.
Reed et al., "Remotely Adjustable Solid-State Lamp," U.S. Appl. No. 61/641,781, filed May 2, 2012, 65 pages.
Reed et al., "Remotely Adjustable Solid-State Lamp," U.S. Appl. No. 13/875,130, filed May 1, 2013, 65 pages.
Reed et al., "Turbulent Flow Cooling for Electronic Ballast," U.S. Appl. No. 61/088,651, filed Aug. 13, 2008, 23 pages.
Reed, "Adjustable Output Solid-State Lighting Device," U.S. Appl. No. 61/567,308, filed Dec. 6, 2011, 49 pages.
Reed, "Apparatus and Method of Energy Efficient Illumination," U.S. Appl. No. 61/333,983, filed May 12, 2010, 57 pages.
Reed, "Apparatus and Method of Energy Efficient Illumination," Office Action mailed Dec. 5, 2012, for U.S. Appl. No. 12/784,091, 18 pages.
Reed, "Apparatus and Method of Energy Efficient Illumination," Amendment filed Apr. 4, 2013, for U.S. Appl. No. 12/784,091, 15 pages.
Reed, "Apparatus and Method of Energy Efficient Illumination," Office Action mailed Apr. 24, 2013, for U.S. Appl. No. 12/784,091, 12 pages.
Reed, "Apparatus and Method of Energy Efficient Illumination," Amendment filed May 14, 2013, for U.S. Appl. No. 12/784,091, 9 pages.

(56) References Cited

OTHER PUBLICATIONS

Reed, "Apparatus and Method of Energy Efficient Illumination," Notice of Allowance mailed May 23, 2013, for U.S. Appl. No. 12/784,091, 6 pages.
Reed, "Apparatus and Method of Energy Efficient Illumination," U.S. Appl. No. 61/346,263, filed May 19, 2010, 67 pages.
Reed, "Apparatus and Method of Energy Efficient Illumination," Office Action mailed Dec. 5, 2012, for U.S. Appl. No. 12/784,093, 13 pages.
Reed, "Apparatus and Method of Energy Efficient Illumination," Amendment filed Apr. 2, 2013, for U.S. Appl. No. 12/784,093, 13 pages.
Reed, "Apparatus and Method of Energy Efficient Illumination," Notice of Allowance mailed Apr. 12, 2013, for U.S. Appl. No. 12/784,093, 9 pages.
Reed, "Apparatus and Method of Energy Efficient Illumination," U.S. Appl. No. 13/943,537, filed Jul. 16, 2013, 67 pages.
Reed, "Apparatus and Method of Energy Efficient Illumination Using Received Signals," Office Action mailed Oct. 1, 2013, for U.S. Appl. No. 13/085,301, 11 pages.
Reed, "Electronic Control to Regulate Power for Solid-State Lighting and Methods Thereof," U.S. Appl. No. 61/115,438, filed Nov. 17, 2008, 51 pages.
Reed, "Electronic Control to Regulate Power for Solid-State Lighting and Methods Thereof," U.S. Appl. No. 61/154,619, filed Feb. 23, 2009, 62 pages.
Reed, "Electronic Control to Regulate Power for Solid-State Lighting and Methods Thereof," Office Action mailed Feb. 28, 2013, for U.S. Appl. No. 12/619,535, 17 pages.
Reed, "Electronic Control to Regulate Power for Solid-State Lighting and Methods Thereof," Amendment filed May 24, 2013, for U.S. Appl. No. 12/619,535, 21 pages.
Reed, "Electronic Control to Regulate Power for Solid-State Lighting and Methods Thereof," Office Action mailed Jul. 30, 2013, for U.S. Appl. No. 12/619,535, 15 pages.
Reed, "Electronic Control to Regulate Power for Solid-State Lighting and Methods Thereof," Amendment filed Oct. 30, 2013, for U.S. Appl. No. 12/619,535, 5 pages.
Reed, "Electrostatic Discharge Protection for Luminaire," Office Action mailed Mar. 15, 2013, for U.S. Appl. No. 13/212,074, 11 pages.
Reed, "Electrostatic Discharge Protection for Luminaire," Amendment filed Jun. 17, 2013, for U.S. Appl. No. 13/212,074, 11 pages.
Reed, "Electrostatic Discharge Protection for Luminaire," Notice of Allowance mailed Sep. 12, 2013, for U.S. Appl. No. 13/212,074, 6 pages.
Reed, "Luminaire With Ambient Sensing and Autonomous Control Capabilities," U.S. Appl. No. 61/728,150, filed Nov. 19, 2012, 83 pages.
Reed, "Luminaire With Ambient Sensing and Autonomous Control Capabilities," U.S. Appl. No. 13/786,332, filed Mar. 5, 2013, 86 pages.
Reed, "Luminaire With Atmospheric Electrical Activity Detection and Visual Alert Capabilities," U.S. Appl. No. 61/649,159, filed Aug. 28, 2012, 52 pages.
Reed, "Luminaire With Atmospheric Electrical Activity Detection and Visual Alert Capabilities," U.S. Appl. No. 13/786,114, filed Mar. 5, 2013, 52 pages.
Reed, "Luminaire With Switch-Mode Converter Power Monitoring," U.S. Appl. No. 61/723,675, filed Nov. 7, 2012, 73 pages.
Reed, "Luminaire With Switch-Mode Converter Power Monitoring," U.S. Appl. No. 14/074,166, filed Nov. 7, 2013, 73 pages.
Reed, "Photocontrol for Luminaire Consumes Very Low Power," U.S. Appl. No. 61/849,841, filed Jul. 24, 2013, 41 pages.
Reed, "Resonant Network for Reduction of Flicker Perception in Solid State Lighting Systems," U.S. Appl. No. 61/527,029, filed Aug. 24, 2011, 41 pages.
Reed, "Resonant Network for Reduction of Flicker Perception in Solid State Lighting Systems," Notice of Allowance mailed Sep. 30, 2013, for U.S. Appl. No. 13/592,590, 9 pages.
Reed, "Solid State Hospitality Lamp," U.S. Appl. No. 61/692,619, filed Aug. 23, 2012, 32 pages.
Reed, "Solid State Hospitality Lamp," U.S. Appl. No. 13/973,696, filed Aug. 22, 2013, 32 pages.
Reed, "Solid State Lighting, Drive Circuit and Method of Driving Same," U.S. Appl. No. 61/640,963, filed May 1, 2012, 24 pages.
Renesas Electronics, "Zener Diodes for Surge Absorption—Applications of high-intensity LED," Apr. 2010, 1 page.
Renn et al., "Solid State Lighting Device and Method Employing Heat Exchanger Thermally Coupled Circuit Board," U.S. Appl. No. 61/357,421, filed Jun. 22, 2010, 49 pages.
Tyco Electronics, "Circuit Protection," retrieved Jun. 10, 2011, retrieved from http://www.tycoelectronics.com/en/products/circuit-protection.html, 2 pages.
Written Opinion, mailed Jul. 9, 2009 for PCT/US2009/043171, 8 pages.
Written Opinion, mailed Jun. 21, 2010 for PCT/US2009/064625, 5 pages.
Written Opinion, mailed Dec. 13, 2010 for PCT/US2010/035649, 4 pages.
Written Opinion, mailed Dec. 15, 2010 for PCT/US2010/035658, 3 pages.
Written Opinion, mailed Dec. 28, 2010 for PCT/US2010/035651, 3 pages.
Written Opinion, mailed Sep. 30, 2011 for PCT/US2011/021359, 4 pages.
Written Opinion, mailed Oct. 8, 2012 for PCT/US2012/033059, 3 pages.
Written Opinion, mailed Jan. 14, 2013 for PCT/US2012/052009, 5 pages.
Written Opinion, mailed Feb. 27, 2013 for PCT/US2012/065476, 8 pages.
International Search Report mailed Nov. 11, 2014, for International Application No. PCT/US2014/047867, 3 pages.
Reed et al., "Systems and Methods That Employ Object Recognition," Amendment filed Nov. 21, 2014, for U.S. Appl. No. 13/411,321, 20 pages.
Reed, "Apparatus and Method of Energy Efficient Illumination," Amendment filed Sep. 30, 2014, for U.S. Appl. No. 14/329,508, 18 pages.
Reed, "Apparatus and Method of Energy Efficient Illumination," Notice of Allowance mailed Nov. 5, 2014, for U.S. Appl. No. 14/329,508, 10 pages.
Reed, "Apparatus and Method of Energy Efficient Illumination Using Received Signals," U.S. Appl. No. 14/557,275, filed Dec. 1, 2014, 92 pages.
Reed, "High Efficiency Power Controller for Luminaire," U.S. Appl. No. 14/546,354, filed Nov. 18, 2014, 33 pages.
Written Opinion mailed Nov. 11, 2014, for International Application No. PCT/US2014/047867, 5 pages.

\* cited by examiner

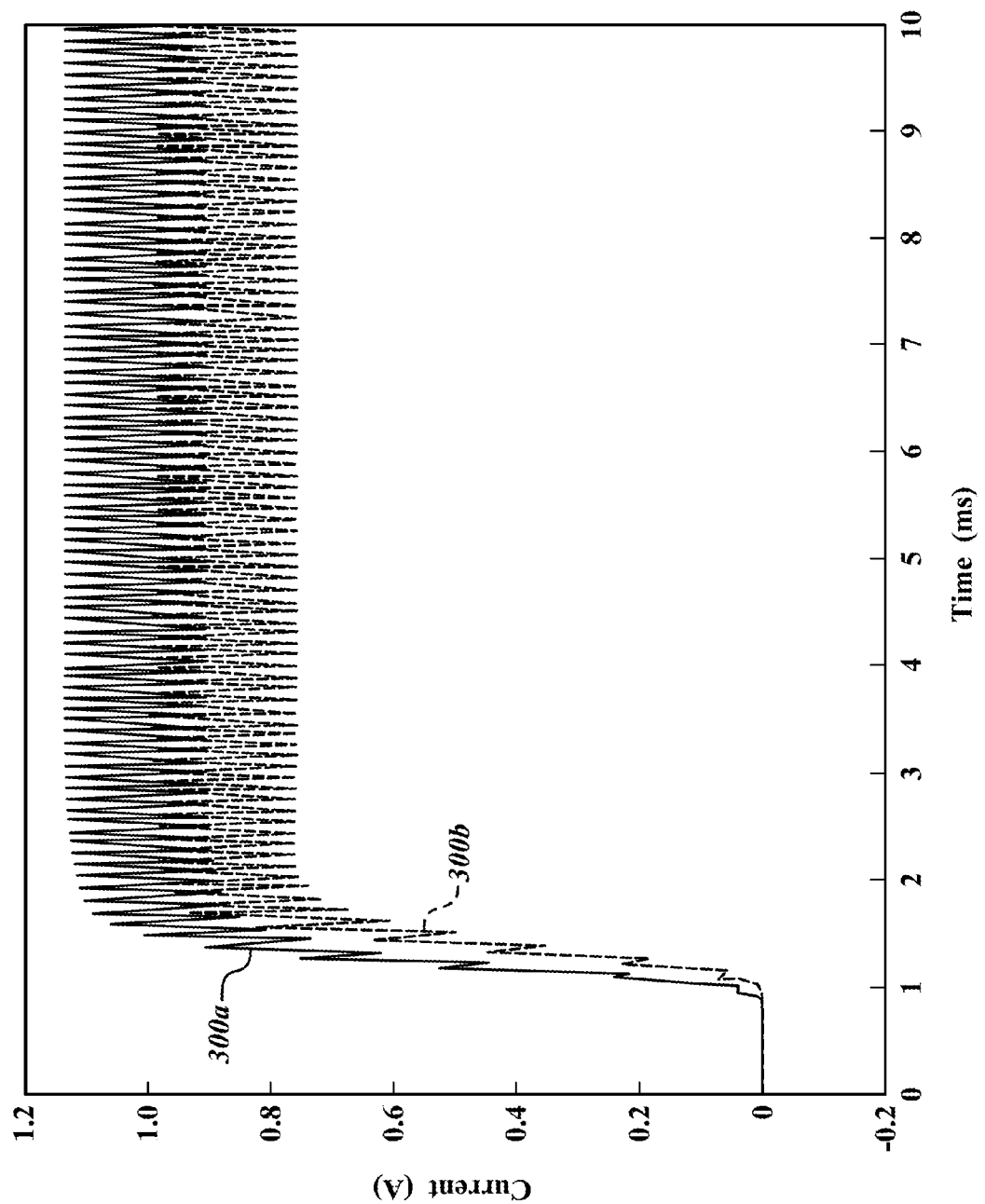

SOLID STATE LIGHTING, DRIVE CIRCUIT AND METHOD OF DRIVING SAME

BACKGROUND

1. Technical Field

This disclosure generally relates to solid state lighting, for example lighting that employs solid state light sources such a light emitting diodes (LEDs), and in particular drive circuits which supply electrical power to solid state lighting.

2. Description of the Related Art

Solid state lighting has many advantages over traditional lighting, such as incandescent and fluorescent bulbs. Solid state lighting devices exhibit lower energy consumption, longer lifetime, and improved robustness over traditional lighting.

In many solid state lighting applications, a plurality of light emitting diodes (LEDs) are electrically coupled in series configuration, with the same current flowing through all LEDs in the series, thereby insuring that all the LEDs in the "string" have a similar level of brightness or output.

LEDs have a forward voltage, below which little light is emitted. For example, a CREE XP-G type LED has a forward voltage (Vf) of approximately 3.15V. The forward voltage Vf varies considerably between individual LEDs, for example from 2.9V to 3.5V. A series coupled "string" of LEDs therefore has a string forward voltage that is equal to the sum of the forward voltages Vf of the individual LEDs in the string. For example, a string of 16 LEDs might have a forward voltage Vf of 51 Volts. While the forward voltage Vf varies somewhat depending upon the amount of current through the LEDs, this variation is typically small.

Solid state luminaires using LED light sources typically use power converters to convert the mains line voltage into a constant current source to power the LEDs. Switch mode type power converters are typically used to achieve high conversion efficiency.

It is often desirable to design power converters that have an output voltage of 60 volts DC or less in order to comply with the safety low voltage upper limit imposed by safety compliance regulations. Due to component tolerances and open circuit voltage limiting circuitry, it is common to use an LED string with an approximately 50V forward voltage. Commonly available high flux LEDs can dissipate 3 Watts of power, so a 16 LED string typically consumes approximately 48 Watts of power.

There are two options if a higher power lamp or luminaire is desired. A first option is adding a second LED string and second power converter to a lamp or luminaire having a first LED string and respective first power converter. In this option, each LED string is powered via its own respective power converter. A second option is to electrically couple a second string of LEDs in parallel with a first string of LEDs, both strings of LEDs powered via the same power converter. The second option eliminates one power converter so is less costly than the first option.

A drawback of the second option employing parallel strings of LEDs is a "current hogging" effect that results when one LED string has a lower forward voltage Vf than the other parallel string. Unless the LED strings are selected such the respective forward voltages are almost perfectly matched, the current through one LED string will be significantly higher than the current through the other LED string, leading to LED lifetime reduction or even immediate failure. In addition, the LED strings will emit different luminous flux, which may be asthetically objectionable depending upon the design of the luminaire.

Even with careful matching of the string forward voltages of the LED strings, the LED strings must be mounted in such a way as to be isothermal. LED forward voltage Vf is known to vary widely with temperature, so if the LED strings are mounted on different areas of a heat sink, or for some reason have differential cooling, the current in the LED strings will become unbalanced with respect to one another.

Traditional approaches for equalizing current in parallel strings of LEDs have been to use "ballast" resistors, separate linear current regulators for each LED string, and/or careful matching of string forward voltages for the LED strings.

"Ballast" resistors give some electrical isolation between the LED strings but are pure dissipaters, considerably reducing energy efficiency. The addition of linear current regulators, as opposed to switch mode regulators, is somewhat superior to the use of ballast resistors, but still lowers energy efficiency of the luminaire. Forward voltage matching of the LED strings is costly, and often results in high rejection rates of parts. Forward voltage matching also requires that the LED strings be measured at very precisely controlled temperatures, which requires elaborate equipment.

Additionally, it is noted that LEDs may fail in the field because of incorrect soldering, electrostatic discharge or other reasons. In the overwhelming majority of cases the LED fails as a shorted diode. Such reduces the string forward voltage by one LED Vf (e.g., approximately 3 volts for white LEDs). Thus, even if string forward voltages are careful matched during manufacture, in use the string forward voltage may change, leading to the aforementioned problems.

An electrically efficient, easy and inexpensive to manufacture, and/or uncomplicated approach to addressing the aforementioned problems is desirable to make solid state lighting more affordable, robust, and/or aesthetically pleasing.

BRIEF SUMMARY

The approaches described herein employ a power converter output stage that provides acceptable current matching between sets or strings of solid state light sources (e.g., LEDs) with different forward voltages, and protects the sets or strings from excessive over-current in the case of a light source failing as a short. The sets or strings are electrically coupled across respective inductors of a secondary of a transformer, the sets or strings not electrically in parallel with one another. The secondary of the transformer essentially self balances. The embodiments described employ an LLC resonant converter topology, but could be implemented as part of a Flyback, Forward Convertor or other switch mode topology.

A system for solid state lighting may be summarized as including a transformer having a primary side and a secondary side, the primary side including at least a first primary inductor, the secondary side including at least a pair of secondary inductors, each of the secondary inductors having a respective node that provides current to a respective one of a pair of strings of solid state light sources and not the other one of the pair of strings of solid state light sources, and the secondary side having a center tap between the pair of secondary inductors that provides a common ground to each of the pair of strings of solid state light sources; and a drive circuit electrically coupled to drive the primary side of the transformer.

The drive circuit may be a resonator drive that includes a resonator inductor and a resonator capacitor, the resonator inductor and the resonator capacitor electrically coupled in series with one another and with the first primary inductor of the transformer to form an LLC resonator. The drive circuit may further include a first switch and a second switch, the first switch and the second switch operable to selectively provide respective first and second current paths between a DC voltage source and the LLC resonator. The first switch and the second switch may be each respective ones of at least two metal oxide semiconductor field effect transistors. The drive circuit may further include a first pulse type voltage source electrically coupled to drive the first switch and a second pulse type voltage source electrically coupled to drive the second switch. The first and the second pulse type voltage sources may drive the first and the second switches, respectively, such that both of the first and the second switches are not ON at a same time. The first and the second pulse type voltage sources may drive the first and the second switches, respectively, such that there is a defined gap between successive turning ON and turning OFF of the first and the second switches. The gap may be approximately 1.6 microseconds in duration. The first pulse type voltage source may produce a first square wave output with pulses at approximately every 0.8 microseconds and the second pulse type voltage source may produce a first square wave output with pulses at approximately every 11.33 microseconds. The circuit may further include a first rectifier diode electrically coupled between a first one of the nodes and a first one of the strings of solid state light sources; and a second rectifier diode electrically coupled between a second one of the nodes and a second one of the strings of solid state light sources. The circuit may further include the first string solid state light sources, the first string of solid state light sources consisting of a first plurality light emitting diodes electrically coupled in series; and the second string of solid state light sources, the second string of solid state light sources consisting of a second plurality light emitting diodes electrically coupled in series.

A solid state lighting luminaire may be summarized as including a first set of solid state light sources electrically coupled in series with one another; a second set of solid state light sources electrically coupled in series with one another; a transformer having a primary side and a secondary side, the primary side including at least a primary inductor, the secondary side including at least a first secondary inductor and a second secondary inductor, the first set of solid state light sources electrically coupled across the first secondary inductor of the transformer and not across the second secondary inductor of the transformer, and the second set of solid state light sources electrically coupled across the second secondary inductor of the transformer and not across the first secondary inductor of the transformer; and a resonator drive circuit which includes a resonator inductor, a resonator capacitor, a first switch and a second switch, the resonator inductor and the resonator capacitor electrically coupled in series with one another and with the primary inductor of the transformer, the first and the second switch operable to selectively provide a drive signal to the primary inductor of the transformer.

The first switch and the second switch may be operable to selectively provide respective first and second current paths between a DC voltage source and the primary inductor of the transformer. The drive circuit may further include a first pulse type voltage source electrically coupled to drive the first switch and a second pulse type voltage source electrically coupled to drive the second switch such that both of the first and the second switches are not ON at a same time. The first and the second pulse type voltage sources may drive the first and the second switches, respectively, such that there is a defined gap between successive turning ON and turning OFF of the first and the second switches. The gap may be approximately 1.6 microseconds in duration, the first pulse type voltage source may produce a first square wave output with pulses at approximately every 0.8 microseconds, and the second pulse type voltage source may produce a first square wave output with pulses at approximately every 11.33 microseconds.

A method of operation in a solid state lighting system which includes a first plurality of solid state light emitters electrically coupled in series and a second set of solid state light emitters electrically coupled in series, and a transformer that includes a primary side and a secondary side that includes a first secondary inductor and a second secondary inductor, the first plurality of solid state light emitters electrically coupled across only the first secondary inductor and the second plurality of solid state light emitters electrically coupled across only the second secondary inductor, may be summarized as including supplying a number of drive signals to control operation of a first switch to selectively electrically couple an LLC resonator to a voltage source via a first electrically conductive path, the LLC resonator including a resonator inductor, a resonator capacitor and a primary inductor of the transformer, the resonator inductor, the resonator capacitor and the primary inductor electrically coupled in series with one another; and supplying a number of drive signals to control operation of a second switch to selectively electrically couple the LLC resonator to the voltage source current return circuit via a second electrically conductive path only when the LLC resonator is not electrically coupled to the voltage source via the first electrically conductive path, the second electrically conductive path different from the first electrically conductive path.

Supplying a number of drive signals to control operation of a first switch may include supplying the drive signals from a first pulse type voltage source to a gate of the first switch and supplying a number of drive signals to control operation of a second switch includes supplying the drive signals from a second pulse type voltage source to a gate of the second switch. Supplying the drive signals from a first pulse type voltage source to a gate of the first switch may include supplying a first square wave signal having pulses at approximately every 21 microseconds and supplying the drive signals from a second pulse type voltage source to a gate of the second switch may include providing a second square wave signal having pulses at approximately every 21 microseconds, with a gap of approximately 1.6 microseconds in duration between a fall in a pulse in one of the square wave signals and a rise in a subsequent pulse in the other one of the square wave signals. The pulses may each have a rise time of approximately 10 nanoseconds and a fall time of approximately 10 nanoseconds.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

FIG. 3 is a graph of currents for the sets of solid state light emitters of the solid state lighting system of FIG. 1 as model with one solid state light emitter faulted to short, illustrating a smaller mismatch ratio than would otherwise result from a conventional approach.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with lighting systems, for example power converters, thermal management structures and subsystems, and/or solid state lights have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

As used in the specification and the appended claims, references are made to a "node" or "nodes." It is understood that a node may be a pad, a pin, a junction, a connector, a wire, or any other point recognizable by one of ordinary skill in the art as being suitable for making an electrical connection within an integrated circuit, on a circuit board, in a chassis, or the like.

The headings and Abstract of the Disclosure provided herein are for convenience only and do not interpret the scope or meaning of the embodiments.

Figure 1:
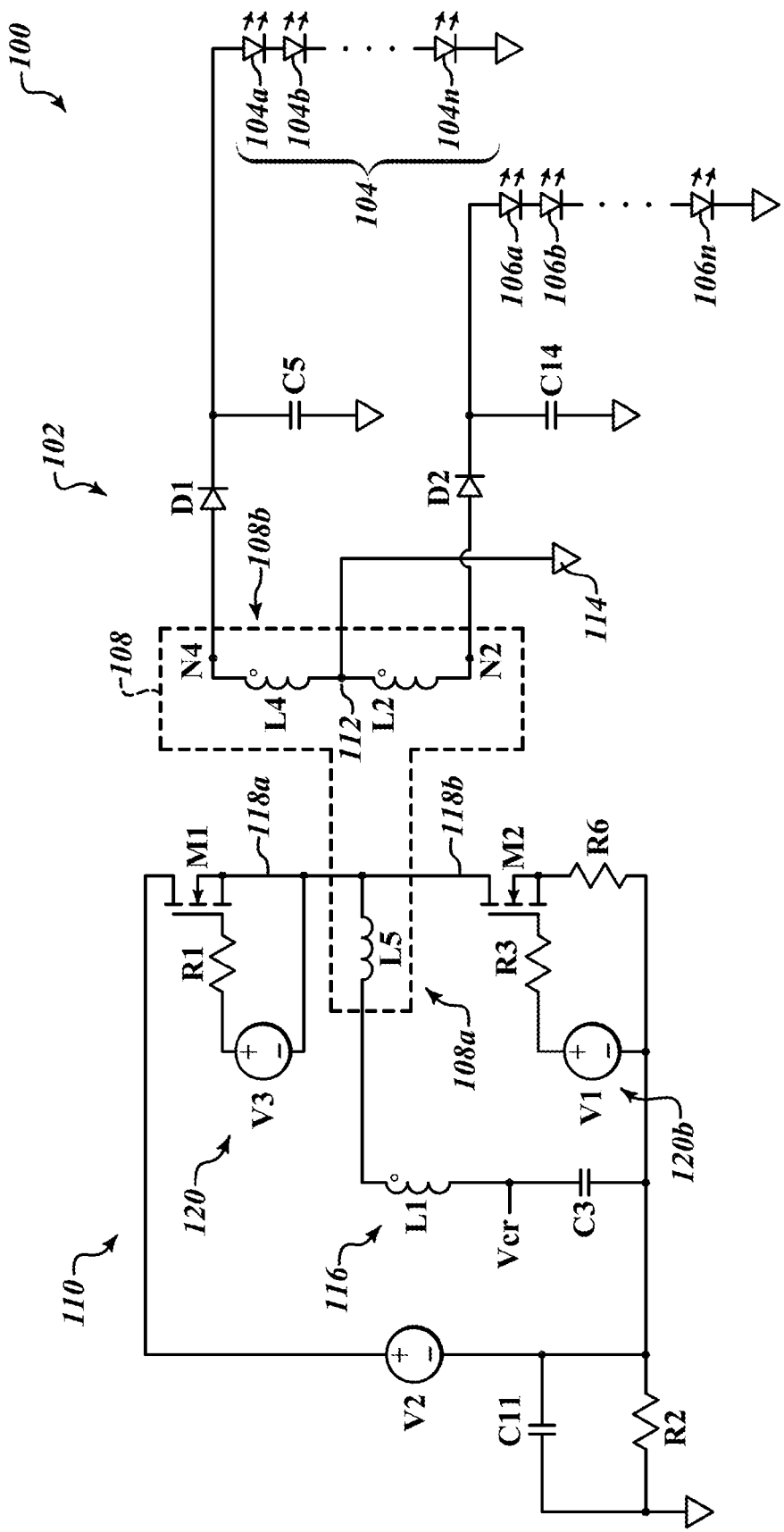
FIG. 1 is a schematic diagram of a solid state lighting system, according to one illustrated embodiment.

FIG. 1 shows a solid state lighting system or luminaire 100, according to one illustrated embodiment.

The solid state lighting system 100 includes a power supply 102 which supplies current to two or more sets 104, 106 of solid state light sources 104a, 104b-104n (three illustrated), 106a, 106b-106n (three illustrated). The sets of solid state light sources 104, 106 may be part of the solid state lighting system 100, or may optionally be supplied separately therefrom and electrically coupled thereto, for example by an end user consumer.

The solid state light sources 104a, 104b-104n, 106a, 106b-106n may take a variety of forms, for example light emitting diodes (LEDs). Suitable LEDs may for example include those commercially available from CREE under the trade name XP-G™ or from OSRAM Opto Semiconductors Inc. under Part No. LW W5AP LZMZ 5K8L. As previously noted, such LEDS have a forward voltage (Vf) of approximately 3.15V, but individual ones of these commercially available LEDs may vary in voltage from approximately 2.9V to approximately 3.5V. The solid state light sources 104a, 104b-104n, 106a, 106b-106n of each set 104, 106 are electrically coupled in series with one another in the respective set 104, 106, and thus commonly referred to as a string or string of solid state light sources.

The power supply 102 includes a transformer 108 (delineated in FIG. 1 by broken line box), a drive circuit 110, and other associated circuitry and electronics.

The transformer 108 includes a primary 108a and a secondary 108b. The primary 108a includes a primary inductor L5. The secondary 108b includes at least a first secondary inductor L4 and a second secondary inductor L2. The secondary 108b may be centered tapped 112, which provides a ground 114 for each of the sets of solid state light sources 104, 106. Each of the sets of solid state light sources 104, 106 is also electrically coupled to a respective one of the first and second secondary inductors L4, L2 at respective nodes N4, N2. Thus, each set of solid state light sources 104, 106 is electrically coupled across a respective one of the secondary inductors L4, L2, and are thus the set of solid state light sources 104, 106 not electrically in parallel with one another.

Output rectifiers D1, D2 are electrically coupled between the sets of solid state light sources 104, 106 and the respective nodes N4, N2. Suitable output rectifiers may include those commercially available from ON Semiconductor under the Part Number MURS320. Capacitors C5, C14 coupled to ground provide for filtering of the current supplied to the sets of solid state light sources 104, 106.

The drive circuit 110 includes an LLC resonator 116 formed by a resonator inductor L1, resonator capacitor C3 and the primary inductor L5 of the transformer 108, which are all electrically coupled in series with one another. The drive circuit 110 includes a first switch M1 and a second switch M2, which are operable to selectively couple the LLC resonator 116 to a voltage source V2 and a drive resistor R6 via respective first and second conductive paths 118a, 118b. The switches M1, M2 may take a variety of forms suitable for handling the voltages and currents expected in operation. For example, the switches M1, M2 may take the form of one or more metal-oxide semiconductor field-effect transistors (MOSFETs), insulated-gate bipolar transistors (IGBTs), or bipolar junction transistors (BJTs). Suitable MOSFETs may, for instance take the form of those commercially available from Infineon Technologies under Part No. SPA11N60C3. Two or more transistors may be electrically coupled in parallel to form a switch suitable to handle large loads. The voltage source V2 may, for instance, take the form of a DC bus, which may be supplied by a supply or input converter (not illustrated). The supply converter may, for example, take the form of a switch mode boost converter which boosts a voltage from mains (e.g., AC voltage supplied to light fixtures and receptacles at approximately 170 volts zero-to-peak, or approximately 110-120 volts root-mean-squared (rms) zero-to-peak) to a suitably high voltage (e.g., 460 VDC). Such a high voltage may advantageously be employed to achieve a power factor close to 1.

The drive circuit 110 includes a pair of drivers 120a, 120b electrically coupled to gates of respective ones of the switches M1, M2 to supply drive signals thereto. Each of the drivers 120a, 120b may include a respective pulse type voltage source V3, V1, and gate resistors R1, R15, respectively.

The drivers 120a, 120b drive the respective switches M1, M2 such that both of the first and the second switches are not ON at a same time. The drivers 120a, 120b may drive the switches M1, M2 such that there is a defined gap between successive turning ON and turning OFF of the first and the second switches M1, M2. The gap may, for example, be approximately 0.16 microseconds in duration. The first pulse type voltage source V3 may produce a first square wave output with pulses. The pulses may, for example, occur approximately every 0.8 microseconds. The second pulse type voltage source V1 produces a second square wave output with pulses. The pulses may, for example, occur at approximately every 11.33 microseconds.

Figure 2:
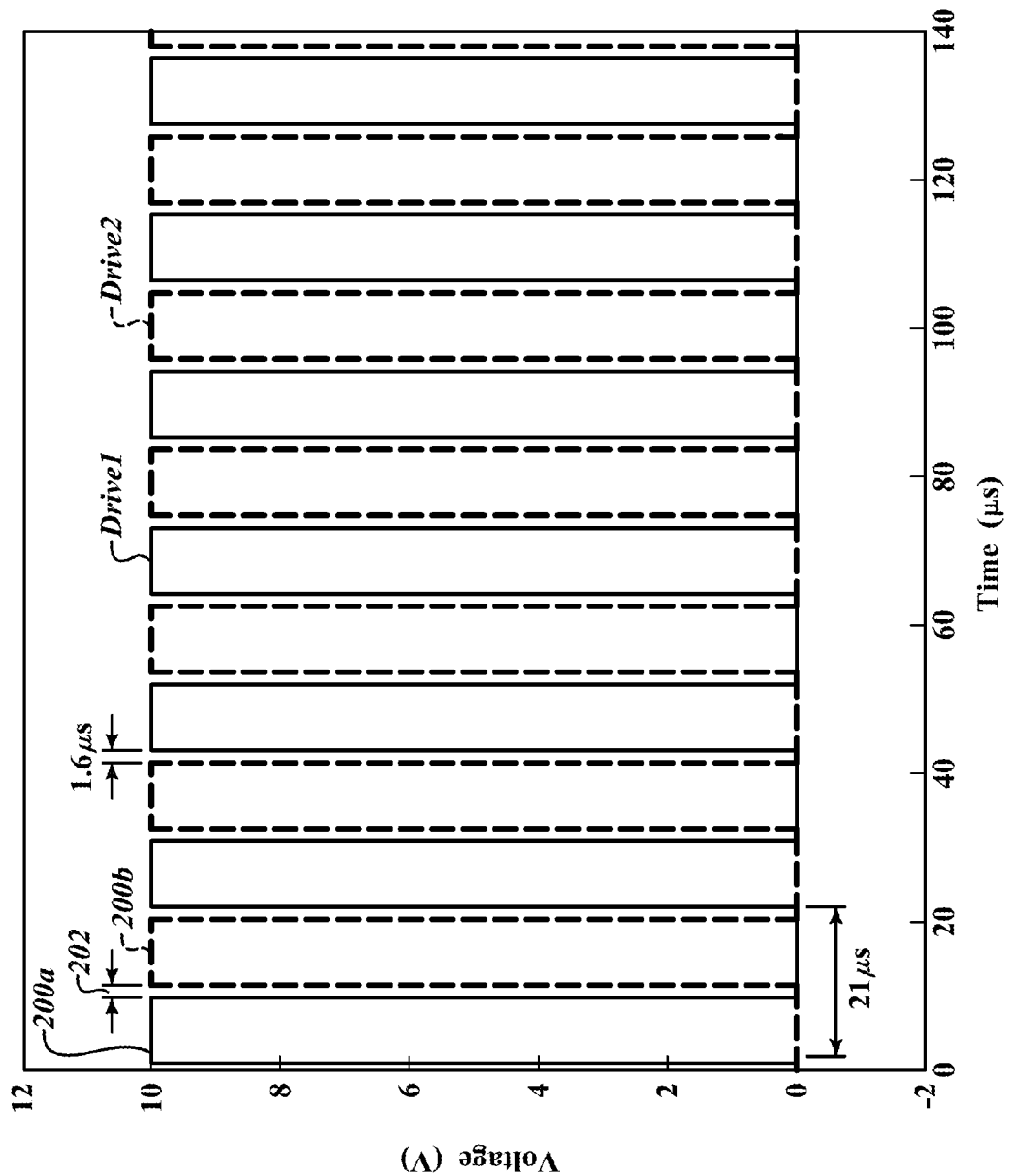
FIG. 2 is a graph showing drive signals generated by drivers and supplied to control switches of the lighting system of FIG. 1, according to one illustrated embodiment.

As best illustrated in FIG. 2, a first driver 120a may, for example, produce a square wave pulsed drive signal 200a which goes from 0V to 10V at 0.8 microseconds, with a rise time of 10 nanoseconds and fall time of 10 nanoseconds, and is ON for a duration of 8.93 microseconds, with a total 360 duty cycle of 21.01 microseconds. Also as illustrated in FIG. 2, a second driver 120b may, for example, produce a square wave pulsed drive signal 200b which goes from 0V to 10V at 11.33 microseconds, with a rise time of 10 nanoseconds and fall time of 10 nanoseconds, and is ON for a duration of 8.93 microseconds, with a total 360 duty cycle of 21.01 microseconds. As noted, the first and second switches M1, M2 will not be ON (i.e., closed or conducting) at the same time. Also as noted, there may be a gap 202 (only one called out) of a defined duration (e.g., 0.16 microseconds) between turning OFF one of the switches M1, M2 and subsequently turning ON the other one of the switches M1, M2.

These parameters were used to model a circuit similar to that illustrated in FIG. 1, but with 16 LEDs in the first set 104 and only 15 LEDs in the second set 106 to simulate a condition where one LED in the second set has failed as a short, and thus has no associated forward voltage Vf. Such may also be representative of a simple mismatch between the string forward voltage of the two sets of solid state light sources 104, 106. The result of such modeling using the Simulation Program with Integrated Circuit Emphasis (i.e., SPICE) program is illustrated in FIG. 3.

FIG. 3 illustrates the currents 300a, 300b between the two sets of solid state light sources or strings 104, 106 (respectively) where the strings 104, 106 have different forward voltages. As noted above, the difference in string forward voltage may be the result of a fault or failure of one or more of the LEDs, and/or may result from mismatch due to the differences between nominal forward voltage and actual forward voltage of the individual LEDs making up the sets of solid state light sources 104, 106. The RMS values for the first and second sets of solid state light sources 104, 106 are found to be 0.849 amps and 0.987 amps respectively. This corresponds to a relatively small miss-match ratio of approximately 1.16 to 1.

Modeling of a more conventional approach in which the sets of solid state light sources were electrically coupled in parallel with one another was performed for the same parameters using SPICE. Such resulted in RMS values for the first and the second sets of solid state light sources 104, 106 are of approximately 0.613 amps and 1.23 amps respectively. This corresponds to a relatively high miss-match ratio of 2.01 to 1.

Thus, the approach illustrated and described herein achieves a much closer balance between currents of sets or strings of LEDs which have different forward voltages. Such advantageously protects the set or string having the lower string forward voltage Vf from damage due to excessive current flowing therethrough. Notably, ripple current is at ½ the frequency of the fundamental frequency of the switch mode converter, which may provide further benefits, for instance reducing radiated electro-magnetic interference (EMI). Additionally, this approach achieves better matched luminous output between the sets or strings of solid state light sources than would otherwise be possible, resulting in a much more aesthetically pleasing light output.

The specific values, such as voltages, used herein are purely illustrative, and are not meant to be in anyway limiting on the scope unless expressly recited in the claim(s). Likewise, the arrangements and topologies are merely illustrative and other arrangements and topologies may be employed where consistent with the teachings herein. While specific circuit structures are disclosed, other arrangements that achieve similar functionality may be employed.

The methods illustrated and described herein may include additional acts and/or may omit some acts. The methods illustrated and described herein may perform the acts in a different order. Some of the acts may be performed sequentially, while some acts may be performed concurrently with other acts. Some acts may be merged into a single act through the use of appropriate circuitry.

The various embodiments described above can be combined to provide further embodiments.

To the extent that they are not inconsistent with the teachings herein, the teachings of: U.S. provisional patent application Ser. No. 61/640,963 filed May 1, 2012; Ser. No. 61/052,924 filed May 13, 2008; U.S. patent application Ser. No. 12/437,467 filed May 7, 2009 and published as U.S. patent application Publication No. 2009-0284155; U.S. provisional patent application Ser. No. 61/051,619 filed May 8, 2008; U.S. patent application Ser. No. 12/437,472 filed May 7, 2009 and published as U.S. patent application Publication No. 2009-0278474; U.S. provisional patent application Ser. No. 61/088,651 filed Aug. 13, 2008; U.S. patent application Ser. No. 12/540,250 filed Aug. 12, 2009 and published as U.S. patent application Publication No. 2010-0090577; U.S. provisional patent application Ser. No. 61/115,438 filed Nov. 17, 2008; U.S. provisional patent application Ser. No. 61/154,619 filed Feb. 23, 2009; U.S. patent application Ser. No. 12/619,535 filed Nov. 16, 2008 and published as U.S. patent application Publication No. 2010-0123403; U.S. provisional patent application Ser. No. 61/174,913 filed May 1, 2009; U.S. patent application Ser. No. 12/769,956 filed Apr. 29, 2010 and published as U.S. patent application Publication No. 2010-0277082; U.S. provisional patent application Ser. No. 61/180,017 filed May 20, 2009, U.S. patent application Ser. No. 12/784,080 filed May 2010 and published as U.S. patent application Publication No. 2010-0295946; U.S. provisional patent application Ser. No. 61/229,435 filed Jul. 29, 2009; U.S. patent application Ser. No. 12/846,516 filed Jul. 29, 2010 and published as U.S. patent application Publication No. 2011-0026264; U.S. provisional patent application Ser. No. 61/295,519 filed Jan. 15, 2010; U.S. provisional patent application Ser. No. 61/406,490 filed Oct. 25, 2010; U.S. patent application Ser. No. 13/007,080 filed Jan. 14, 2011; U.S. provisional patent application Ser. No. 61/333,983 filed May 12, 2010; U.S. patent application Ser. No. 12/784,091 filed May 20, 2010 and published as U.S. patent application Publication No. 2011-0295454; U.S. provisional patent application Ser. No. 61/346,263 filed May 19, 2010; U.S. patent application Ser. No. 12/784,093 filed May 20, 2010; U.S. patent application Ser. No. 13/166,626 filed Jun. 22, 2011; U.S. patent application Ser. No. 13/085,301 filed Apr. 12, 2011; U.S. patent application Ser. No. 13/212,074 filed Aug. 17, 2011; and U.S. provisional patent application Ser. No. 61/527,029 filed Aug. 24, 2011 are each incorporated herein by reference in their entirety.

Aspects of the embodiments can be modified, if necessary to employ concepts of the various patents, applications and publications to provide yet further embodiments. For example, the structures and/or methods taught herein may be advantageously employed as an input to the structures taught in the U.S. patent application Publication No. 2010-0123403.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system for solid state lighting, comprising:
a transformer having a primary side and a secondary side, the primary side including at least a first primary inductor, the secondary side including at least a pair of secondary inductors, each of the secondary inductors having a respective node that provides current to a respective one of a pair of strings of solid state light sources and not the other one of the pair of strings of solid state light sources, the secondary side having a center tap between the pair of secondary inductors that provides a common ground to each of the pair of strings of solid state light sources; and
a drive circuit electrically coupled to drive the primary side of the transformer.

2. The circuit of claim 1 wherein the drive circuit is a resonator drive circuit that includes a resonator inductor and a resonator capacitor, the resonator inductor and the resonator capacitor electrically coupled in series with one another and with the first primary inductor of the transformer to form an LLC resonator.

3. The circuit of claim 2 wherein the drive circuit further includes a first switch and a second switch, the first switch and the second switch operable to selectively provide respective first and second current paths between a DC voltage source and the LLC resonator.

4. The circuit of claim 3 wherein the first switch and the second switch are each respective ones of at least two metal oxide semiconductor field effect transistors.

5. The circuit of claim 3 wherein the drive circuit further includes a first pulse type voltage source electrically coupled to drive the first switch and a second pulse type voltage source electrically coupled to drive the second switch.

6. The circuit of claim 5 wherein the first and the second pulse type voltage sources drive the first and the second switches, respectively, such that both of the first and the second switches are not ON at a same time.

7. The circuit of claim 6 wherein the first and the second pulse type voltage sources drive the first and the second switches, respectively, such that there is a defined gap between successive turning ON and turning OFF of the first and the second switches.

8. The circuit of claim 7 wherein the gap is approximately 0.16 microseconds in duration.

9. The circuit of claim 8 wherein the first pulse type voltage source produces a first square wave output with pulses at approximately every 0.8 microseconds and the second pulse type voltage source produces a first square wave output with pulses at approximately every 11.33 microseconds.

10. The circuit of claim 1 further comprising:
a first rectifier diode electrically coupled between a first one of the nodes and a first one of the strings of solid state light sources; and
a second rectifier diode electrically coupled between a second one of the nodes and a second one of the strings of solid state light sources.

11. The circuit of claim 1, further comprising:
the first string solid state light sources, the first string of solid state light sources consisting of a first plurality light emitting diodes electrically coupled in series; and
the second string of solid state light sources, the second string of solid state light sources consisting of a second plurality light emitting diodes electrically coupled in series.

12. A solid state lighting luminaire, comprising:
a first set of solid state light sources electrically coupled in series with one another;
a second set of solid state light sources electrically coupled in series with one another;
a transformer having a primary side and a secondary side, the primary side including at least a primary inductor, the secondary side including at least a first secondary inductor and a second secondary inductor, the first set of solid state light sources electrically coupled across the first secondary inductor of the transformer and not across the second secondary inductor of the transformer, and the second set of solid state light sources electrically coupled across the second secondary inductor of the transformer and not across the first secondary inductor of the transformer; and
a resonator drive circuit which includes a resonator inductor, a resonator capacitor, a first switch and a second switch, the resonator inductor and the resonator capacitor electrically coupled in series with one another and with the primary inductor of the transformer, the first and the second switch operable to selectively provide a drive signal to the primary inductor of the transformer.

13. The solid state lighting luminaire of claim 12 wherein the first switch and the second switch are operable to selectively provide respective first and second current paths between a DC voltage source and the primary inductor of the transformer.

14. The solid state lighting luminaire of claim 13 wherein the drive circuit further includes a first pulse type voltage source electrically coupled to drive the first switch and a second pulse type voltage source electrically coupled to drive the second switch such that both of the first and the second switches are not ON at a same time.

15. The solid state lighting luminaire of claim 14 wherein the first and the second pulse type voltage sources drive the first and the second switches, respectively, such that there is a defined gap between successive turning ON and turning OFF of the first and the second switches.

16. The solid state lighting luminaire of claim 15 wherein the gap is approximately 1.6 microseconds in duration, the first pulse type voltage source produces a first square wave output with pulses at approximately every 21 microseconds, and the second pulse type voltage source produces a first square wave output with pulses at approximately every 21 microseconds where the first square wave and the second square wave are 180 degrees out of phase.

17. A method of operation in a solid state lighting system which includes a first plurality of solid state light emitters electrically coupled in series and a second set of solid state light emitters electrically coupled in series, and a transformer that includes a primary side and a secondary side that includes a first secondary inductor and a second secondary inductor, the first plurality of solid state light emitters electrically coupled across only the first secondary inductor and the second plurality of solid state light emitters electrically coupled across only the second secondary inductor, the method comprising:

supplying a number of drive signals to control operation of a first switch to selectively electrically couple an LLC resonator to a voltage source via a first electrically conductive path, the LLC resonator including a resonator inductor, a resonator capacitor and a primary inductor of the transformer, the resonator inductor, the resonator capacitor and the primary inductor electrically coupled in series with one another; and supplying a number of drive signals to control operation of a second switch to selectively electrically couple the LLC resonator to the voltage source via a second electrically conductive path only when the LLC resonator is not electrically coupled to the voltage source via the first electrically conductive path, the second electrically conductive path different from the first electrically conductive path.

18. The method of claim 17 wherein supplying a number of drive signals to control operation of a first switch includes supplying the drive signals from a first pulse type voltage source to a gate of the first switch and supplying a number of drive signals to control operation of a second switch includes supplying the drive signals from a second pulse type voltage source to a gate of the second switch.

19. The method of claim 18 wherein supplying the drive signals from a first pulse type voltage source to a gate of the first switch includes supplying a first square wave signal having pulses at approximately every 21 microseconds and supplying the drive signals from a second pulse type voltage source to a gate of the second switch includes providing a second square wave signal having pulses at approximately every 21 microseconds, with a gap of approximately 1.6 microseconds in duration between a fall in a pulse in one of the square wave signals and a rise in a subsequent pulse in the other one of the square wave signals.

20. The method of claim 19 wherein the pulses each have a rise time of approximately 10 nanoseconds or less and a fall time of approximately 10 nanoseconds.

* * * * *